US012789154B2

(12) United States Patent
Yang et al.

(10) Patent No.: US 12,789,154 B2
(45) Date of Patent: Nov. 10, 2026

(54) COMPOSITE CYCLONE AND VORTEX REACTOR

(71) Applicant: UNIVERSITY OF NOTTINGHAM NINGBO CHINA, Ningbo (CN)

(72) Inventors: Xiaogang Yang, Ningbo (CN); Jiaying Lu, Ningbo (CN); Yanqing Guo, Ningbo (CN); Shanshan Long, Ningbo (CN); Bin Dong, Ningbo (CN)

(73) Assignee: UNIVERSITY OF NOTTINGHAM NINGBO CHINA, Ningbo (CN)

( * ) Notice: Subject to any disclaimer, the term of this patent is extended or adjusted under 35 U.S.C. 154(b) by 852 days.

(21) Appl. No.: 17/900,397

(22) Filed: Aug. 31, 2022

(65) Prior Publication Data

US 2024/0009637 A1 Jan. 11, 2024

(30) Foreign Application Priority Data

Jul. 8, 2022 (CN) ......................... 202210806218.0

(51) Int. Cl.
*B01F 27/94* (2022.01)
*B01F 23/60* (2022.01)
(Continued)

(52) U.S. Cl.
CPC .............. *B01F 27/94* (2022.01); *B01F 23/60* (2022.01); *B01F 25/102* (2022.01);
(Continued)

(58) Field of Classification Search
CPC .... B01F 5/0665; B01F 3/04099; B01F 7/008; B01F 3/0807; B01F 3/04531;
(Continued)

(56) References Cited

U.S. PATENT DOCUMENTS 3,127,152 A * 3/1964 Schrenk et al. ...... B01F 27/272 366/296
3,741,533 A * 6/1973 Winn, Jr. ................ B01F 25/21 366/136
(Continued)

FOREIGN PATENT DOCUMENTS

CN 115069205 A * 9/2022 .......... B01J 19/1806
GB 1358157 A * 6/1974
WO WO-9411096 A1 * 5/1994 .......... B01J 19/1806

*Primary Examiner* — Charles Cooley
(74) *Attorney, Agent, or Firm* — Bayramoglu Law Offices LLC

(57) ABSTRACT

A composite vortex reactor comprises a Rankine cyclone reactor and a Taylor vortex reactor. The Rankine cyclone reactor comprises a reaction chamber, a side wall of the reaction chamber is provided with a first inlet pipe and a second inlet pipe, and fluids entering the reaction chamber through the first inlet pipe and the second inlet pipe can form a gyro-fluid in the reaction chamber, and the middle of the top of the reaction chamber is provided with a gyroscopic outlet pipe. The Taylor vortex reactor comprises an inner cylinder and an outer cylinder which are coaxially provided, the inner cylinder is driven by a rotary driving device to rotate, an annular reaction space is formed between the inner cylinder and the outer cylinder. The upper end of the outer cylinder is provided with a reaction outlet pipe communicating with an upper portion of the annular reaction space.

10 Claims, 3 Drawing Sheets

(51) Int. Cl.
*B01F 25/10* (2022.01)
*B01F 27/116* (2022.01)
*B01F 101/00* (2022.01)

(52) U.S. Cl.
CPC ........ *B01F 25/1041* (2022.01); *B01F 27/116* (2022.01); *B01F 2101/2204* (2022.01)

(58) Field of Classification Search
CPC .. B01F 3/0853; B01F 7/00816; B01F 5/0256; B01F 13/103; B01F 27/94; B01F 23/60; B01F 27/116; B01F 2101/2204; B01F 27/2723; B01F 25/103; B01F 33/821; B01F 25/10; B01F 25/101; B01F 25/102; B01F 25/104; B01F 25/1041; B01F 25/1042; C12M 27/00; A61K 9/08; A61K 33/00; A61K 9/10; C02F 3/02; C02F 1/727; A23L 2/54; A61J 3/00; C09K 3/00; Y02W 10/15; B01J 19/28; B01J 19/1862; B01J 19/1806; B01J 3/008; B01J 19/2405; H01M 4/485; H01M 10/0525; H01M 2004/028; C01B 25/45; C01G 1/02
USPC .................................... 366/305, 165.1–165.5
See application file for complete search history.

(56) References Cited

U.S. PATENT DOCUMENTS

| | | | | | |
|---|---|---|---|---|---|
| 4,092,013 | A * | 5/1978 | Staaf | B01F 25/10 366/181.5 |
| 10,717,088 | B2 * | 7/2020 | Galaka | B01F 23/50 |
| 2005/0002270 | A1 * | 1/2005 | Bergman | B01F 25/10 366/165.2 |
| 2009/0201760 | A1 * | 8/2009 | Vorage | B01F 25/10 366/163.1 |

* cited by examiner

COMPOSITE CYCLONE AND VORTEX REACTOR

CROSS REFERENCE TO RELATED APPLICATION

This patent application claims the benefit and priority of Chinese Patent Application No. 202210806218.0, filed on Jul. 8, 2022, the disclosure of which is incorporated by reference herein in its entirety as part of the present application.

TECHNICAL FIELD

The present disclosure relates to the technical field of preparation equipment of powder particle materials, and in particular relates to a composite vortex reactor.

BACKGROUND ART

In recent years, Taylor reactor has been widely used in the preparation of powder particle as its unique structure and hydrodynamic characteristics may remarkably strengthen the chemical production process. Flow and mixing have an important influence on the precipitation and crystallization process in the reactor, and ultimately determine the concentration distribution of the product. Taylor reactor is a chemical reactor taking Taylor vortex flows as the principle and is composed of an inner cylinder and an outer cylinder which are coaxial. Taylor vortexes are generated by relative rotation of the inner cylinder and the outer cylinder, and a relatively uniform shear flow field environment is provided. Therefore, the Taylor reactor has the advantages of simple structure, regular flow field structure, easy industrial amplification and the like. A great deal of research has been done on the crystallization process of particles in the Taylor reactor. Through the characterization of the attributes such as crystal form, particle size, morphology and porosity of generated particles, it is deduced that the flow field environment and the vortex structure of the Taylor reactor are beneficial for enhancing mixing among materials, then increasing the interface mass transfer efficiency, and finally preparing the crystal particles with uniform morphology and controllable size. On this basis, in order to further improve the diversity of the flow field environment during the preparation of the powder particle materials, to improve the mixing effect among materials and to increase the interface mass transfer efficiency, a composite vortex reactor is provided.

SUMMARY

An objective of the present disclosure is to provide a composite vortex reactor to solve the problems in the prior art, such that the flow field environment in the reactor is more diversified, the mixing effect among materials is improved, and the interface mass transfer efficiency is increased.

To achieve the objective, the present disclosure provides the following solutions.

The present disclosure provides a composite vortex reactor, which comprises a Rankine cyclone reactor and a Taylor vortex reactor. The Rankine cyclone reactor comprises a reaction chamber, a side wall of the reaction chamber is provided with a first inlet pipe and a second inlet pipe, and fluids entering the reaction chamber through the first inlet pipe and the second inlet pipe may form a gyro-fluid in the reaction chamber, and the middle of the top of the reaction chamber is provided with a gyroscopic outlet pipe. The Taylor vortex reactor comprises an inner cylinder and an outer cylinder which are coaxially provided. The inner cylinder is driven by a rotary driving device to rotate, an annular reaction space is formed between the inner cylinder and the outer cylinder, the middle of the bottom of the annular reaction space communicates with the reaction chamber through the gyroscopic outlet pipe, and the cross-sectional area of the annular reaction space gradually increases from bottom to top. The upper end of the outer cylinder is provided with a reaction outlet pipe communicating with an upper portion of the annular reaction space.

Preferably, the first inlet pipe and the second inlet pipe are respectively arranged at both sides of the reaction chamber and parallel to each other, and the first inlet pipe and the second inlet pipe have opposite fluid entering directions.

Preferably, the reaction outlet pipe and the first inlet pipe are located on the same side and parallel to each other, and the reaction outlet pipe has a fluid outflow direction the same as the fluid entering direction of the first inlet pipe.

Preferably, the reaction chamber is a revolution body-shaped reaction chamber.

Preferably, the outer cylinder is an equal-inner-diameter outer cylinder, the inner diameter of which is equal everywhere from the lower end to the upper end; and the inner cylinder is a variable-outer-diameter inner cylinder, the outer diameter of which gradually decrease from the lower end to the upper end.

Preferably, the outer cylinder is a variable-inner-diameter outer cylinder, the inner diameter of which gradually increases from the lower end to the top end; and the inner cylinder is a variable-outer-diameter inner cylinder, the outer diameter of which gradually increases from the lower end to the upper end.

Preferably, the rotary driving device is a driving motor.

Preferably, the first inlet pipe and the second inlet pipe are respectively connected to a driving pump.

Compared with the prior art, the present disclosure has the following technical effects.

The present disclosure provides a composite vortex reactor. Two types of reaction fluids respectively enter a reaction chamber through a first inlet pipe and a second inlet pipe to form a gyro-fluid in the reaction chamber. The gyro-fluid enters an annular reaction space in a Taylor vortex reactor through a gyroscopic outlet pipe. An inner cylinder is driven by a rotary driving device to rotate in order to make the gyro-fluid generate height-variable-size Taylor vortexes (Taylor vortexes with gradually-changed vortex sizes in a height direction) while performing gyroscopic movement in the annular reaction space, such that the flow field environment in the reactor is more diversified. As the cross-sectional area of the annular reaction space gradually increases from the bottom to the top, the contact reaction time of reaction materials in the annular reaction space may be regulated and controlled, thus improving the mixing effect between the materials and increasing the interface mass transfer efficiency.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
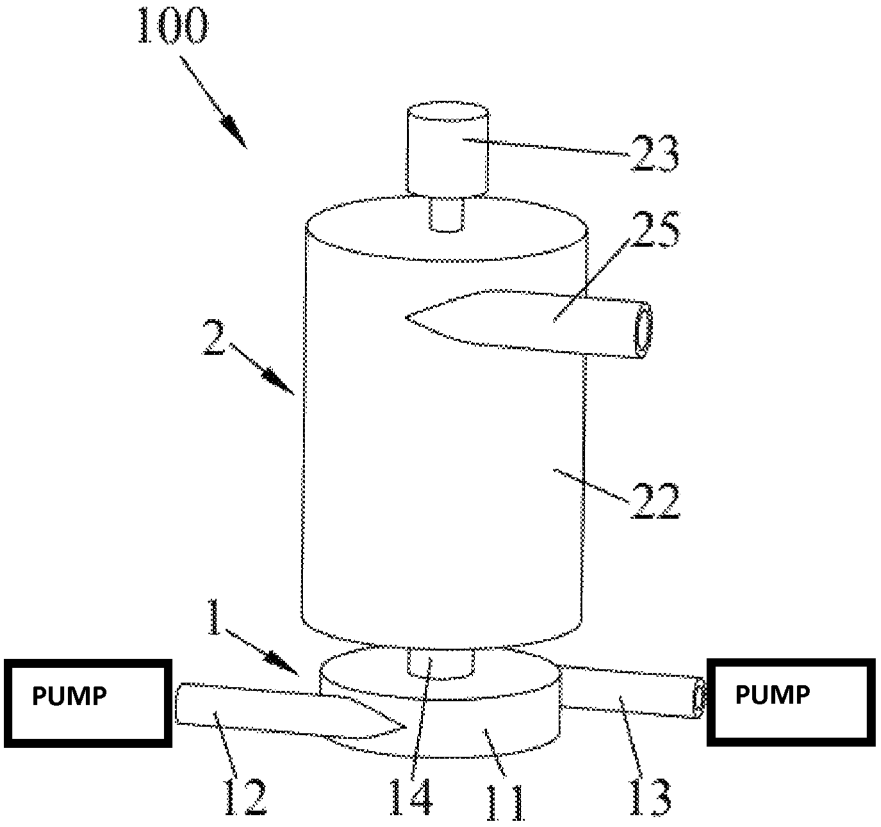
FIG. 1 is a schematic diagram of a three-dimensional structure of a composite vortex reactor in accordance with an embodiment I of the present disclosure.

In the drawings: 100—composite vortex reactor; 1—Rankine cyclone reactor; 11—reaction chamber; 12—first inlet pipe; 13—second inlet pipe; 14—gyroscopic outlet pipe; 2—Taylor vortex reactor; 21—inner cylinder; 22—outer cylinder; 23—rotary driving device; 24—annular reaction space; 25—reaction outlet pipe.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a composite vortex reactor to solve the problems in the prior art, such that a flow field environment in the reactor is more diversified, the flow field shear is easy to control, the mixing effect among the materials is improved, and the interface mass transfer efficiency is increased.

In order to make objectives, features, and advantages of the present disclosure more apparently and understandably, the following further describes the present disclosure in detail with reference to accompanying drawings and specific embodiments.

Embodiment I

Figure 2:
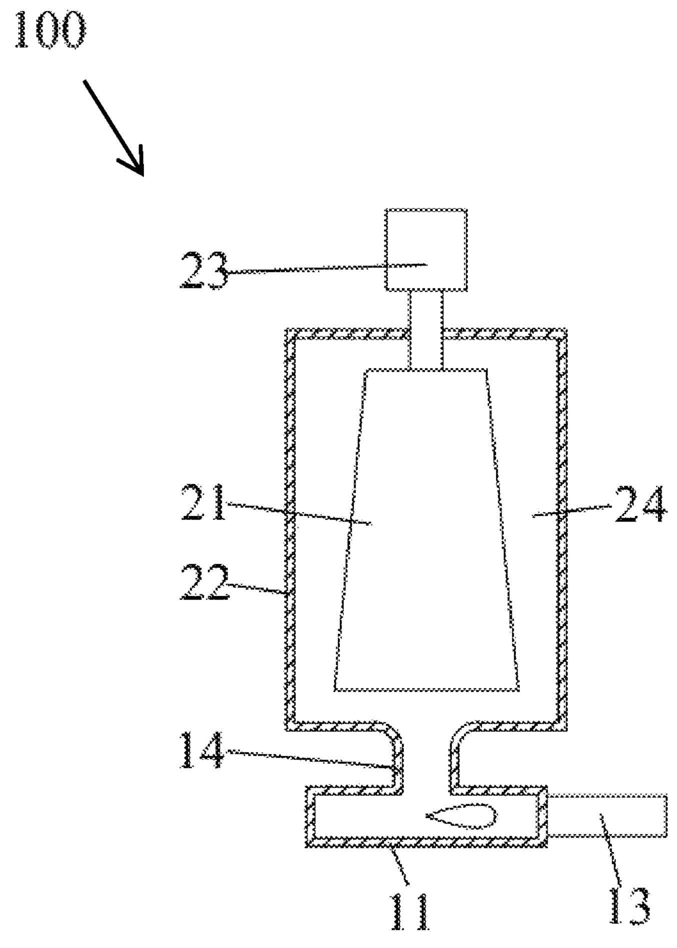
FIG. 2 is a partial cross-sectional schematic diagram of a composite vortex reactor in accordance with an embodiment I of the present disclosure.

As shown in FIG. 1 to FIG. 2, this embodiment provides a composite vortex reactor 100. The composite vortex reactor 100 comprises a Rankine cyclone reactor 1 and a Taylor vortex reactor 2. The Rankine cyclone reactor 1 comprises a reaction chamber 11, a side wall of the reaction chamber 11 is provided with a first inlet pipe 12 and a second inlet pipe 13. Fluids entering the reaction chamber 11 through the first inlet pipe 12 and the second inlet pipe 13 may form a gyro-fluid in the reaction chamber 11. The middle of the top of the reaction chamber 11 is provided with a gyroscopic outlet pipe 14. The Taylor reactor 2 comprises an inner cylinder 21 and an outer cylinder 22 which are coaxially provided. The inner cylinder 21 is driven by a rotary driving device 23 to rotate. An annular reaction space 24 is formed between the inner cylinder 21 and the outer cylinder 22. The middle of the bottom of the annular reaction space 24 communicates with the reaction chamber 11 through the gyroscopic outlet pipe 14, and the cross sectional area of the annular reaction space 24 gradually increases from bottom to top. The upper end of the outer cylinder 22 is provided with a reaction outlet pipe 25 communicating with an upper portion of the annular reaction space 24.

During use of the composite vortex reactor, two types of reaction fluids (particle materials) respectively enter the reaction chamber 11 through the first inlet pipe 12 and the second inlet pipe 13 to form the gyro-fluid in the reaction chamber 11. The gyro-fluid enters the annular reaction space 24 in the Taylor vortex reactor 2 through the gyroscopic outlet pipe 14, and the inner cylinder 21 is driven by the rotary driving device 23 to rotate in order to make the gyro-fluid generate variable-size Taylor vortex while performing gyroscopic movement in the annular reaction space 24, such that the flow field environment in the reactor is more diversified. Moreover, as the cross-sectional area of the annular reaction space 24 gradually increases from the bottom to the top, local turbulent shear and contact reaction time of the reaction materials in the annular reaction space 24 may be regulated and controlled, thus remarkably improving the mixing effect among the materials and increasing the interface mass transfer efficiency. The materials after reaction flow out from the reaction outlet pipe 25.

In this embodiment, the first inlet pipe 12 and the second inlet pipe 13 are respectively arranged at both sides of the reaction chamber 11 and parallel to each other. The first inlet pipe 12 and the second inlet pipe 13 have opposite fluid entering directions. The fluids enter the reaction chamber 11 from the first inlet pipe 12 and the second inlet pipe 13 in a tangential direction of the outer edge of the reaction chamber 11, thus facilitating the formation of gyro-fluid.

In this embodiment, the reaction outlet pipe 25 and the first inlet pipe 12 are located at the same side and parallel to each other. The reaction outlet pipe 25 has a fluid outflow direction the same as the fluid entering direction of the first inlet pipe 12, the gyro-fluid flows out along a tangential direction of the outer cylinder 22, making the outflow process smoother.

In this embodiment, the reaction chamber 11 is a revolution body-shaped reaction chamber, preferably a disc type reaction chamber. In other embodiments, the reaction chamber 11 may also be an elliptic reaction chamber. However, the shape of the reaction chamber 11 is not limited to above two types, other reaction chamber shapes capable of forming the gyro-fluid are within the scope of protection of the present disclosure.

In this embodiment, the outer cylinder 22 is an equal-inner-diameter outer cylinder, the inner diameter of which is equal everywhere from the lower end to the upper end. The inner cylinder 21 is a variable-outer-diameter inner cylinder, the outer diameter of which gradually decreases from the lower end to the upper end. The outer cylinder and the inner cylinder are both simple in structure and convenient to manufacture, facilitating to obtain the annular reaction space 24 with gradually changed cross sectional area. The change of the outer diameter of the variable-outer-diameter inner cylinder along the height is specified by a special function curve based on the conservation of momentum in fluid flow.

In this embodiment, the rotary driving device 23 is a driving motor which is convenient to control. The rotational speed of the inner cylinder 21 may be controlled by the driving motor, thus regulating the flow field environment of the annular reaction space 24, especially the local turbulent shear rate.

In this embodiment, the first inlet pipe 12 and the second inlet pipe 13 are respectively connected to a driving pump (not shown in the figure), such that the flow rates of the two types of fluids entering the reaction chamber 11 may be controlled by the driving pumps respectively.

Embodiment II

Figure 3:
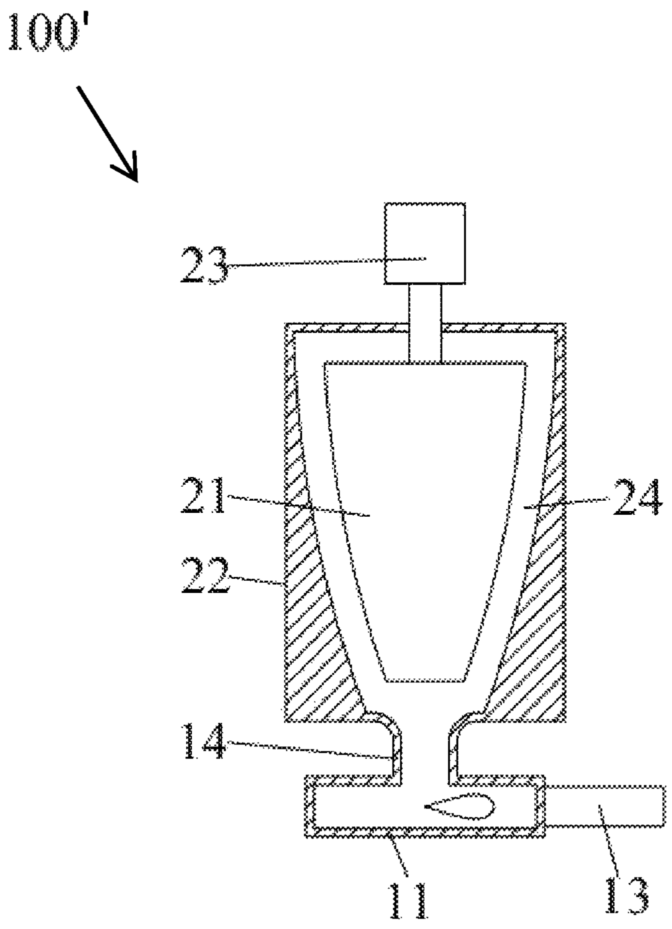
FIG. 3 is a partial cross-sectional schematic diagram of a composite vortex reactor in accordance with an embodiment II of the present disclosure.

As shown in FIG. 3, this embodiment provides a composite vortex reactor 100'. The difference from the Embodiment I is that in this embodiment, the outer cylinder 22 is a variable-inner-diameter outer cylinder, the inner diameter of which gradually increases from the lower end to the upper end; and the inner cylinder 21 is a variable-outer-diameter inner cylinder, the outer diameter of which gradually increases from the lower end to the upper end. The spacing distance between an outer ring (defined by the inner diameter of the outer cylinder) and an inner ring (defined by the outer diameter of the inner cylinder) of the cross section of the annular reaction space 24 is equal from the bottom to the top. The variation of the inner diameter of the variable-inner-diameter outer cylinder and the outer diameter of the variable-outer-diameter inner cylinder along the height is specified by a special function curve according to the conservation of momentum in fluid flow.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A composite vortex reactor, comprising:

a Rankine cyclone reactor that comprises a reaction chamber, wherein a side wall of the reaction chamber is provided with a first inlet pipe and a second inlet pipe which are arranged such that fluids from the first inlet pipe and the second inlet pipe enter the reaction chamber in a tangential direction of an outer edge of the reaction chamber and thereby are able to form a gyro-fluid in the reaction chamber, and a middle of a top of the reaction chamber is provided with a gyroscopic outlet pipe; wherein the first inlet pipe and the second inlet pipe are respectively connected to a driving pump; and a Taylor vortex reactor that comprises an inner cylinder and an outer cylinder which are coaxially provided, wherein the inner cylinder is driven by a rotary driving device to rotate, an annular reaction space is formed between the inner cylinder and the outer cylinder, a middle of a bottom of the annular reaction space communicates with the reaction chamber through the gyroscopic outlet pipe, wherein during use of the composite vortex reactor, two types of reaction fluids respectively enter the reaction chamber through the first inlet pipe and the second inlet pipe to form the gyro-fluid in the reaction chamber, the gyro-fluid enters the annular reaction space in the Taylor vortex reactor through the gyroscopic outlet pipe, and the inner cylinder is driven by the rotary driving device to rotate in order to make the gyro-fluid generate variable-size Taylor vortex while performing gyroscopic movement in the annular reaction space, and wherein the cross-sectional area of the annular reaction space increases from a bottom of the annular reaction space to a top of the annular reaction space, and local turbulent shear and contact reaction time of the reaction materials in the annular reaction space is regulated and controlled, and an upper end of the outer cylinder is provided with a reaction outlet pipe communicating with an upper portion of the annular reaction space.

2. The composite vortex reactor according to claim 1, wherein the first inlet pipe and the second inlet pipe are respectively arranged at opposite sides of the reaction chamber and parallel to each other, and the first inlet pipe and the second inlet pipe have opposite fluid entering directions.

3. The composite vortex reactor according to claim 2, wherein the reaction outlet pipe and the first inlet pipe are located on a same side and parallel to each other, and the reaction outlet pipe has a fluid outflow direction the same as the fluid entering direction of the first inlet pipe.

4. The composite vortex reactor according to claim 3, wherein the reaction outlet pipe is oriented such that a fluid flowing out of the reaction outlet pipe flows along a tangential direction of the outer cylinder.

5. The composite vortex reactor according to claim 1, wherein the reaction chamber is a revolution body-shaped reaction chamber.

6. The composite vortex reactor according to claim 1, wherein the outer cylinder is an equal-inner-diameter outer cylinder, an inner diameter of which is the same from a lower end to an upper end of the outer cylinder; and the inner cylinder is a variable-outer-diameter inner cylinder, an outer diameter of which gradually decreases from a lower end to an upper end of the inner cylinder.

7. The composite vortex reactor according to claim 1, wherein the outer cylinder is a variable-inner-diameter outer cylinder, an inner diameter of which gradually increases from a lower end to an upper end of the outer cylinder; and the inner cylinder is a variable-outer-diameter inner cylinder, an outer diameter of which gradually increases from a lower end to an upper end of the inner cylinder.

8. The composite vortex reactor according to claim 7, wherein a spacing distance between an outer ring (defined by the inner diameter of the outer cylinder) and an inner ring (defined by the outer diameter of the inner cylinder) of the cross section of the annular reaction space is equal from the bottom to the top of the annular reaction space.

9. The composite vortex reactor according to claim 1, wherein the rotary driving device is a driving motor.

10. The composite vortex reactor according to claim 9, wherein the driving motor is configured to control a rotational speed of the inner cylinder so as to regulate a flow field environment of the annular reaction space.

* * * * *